United States Patent Office 2,703,035
Patented Mar. 1, 1955

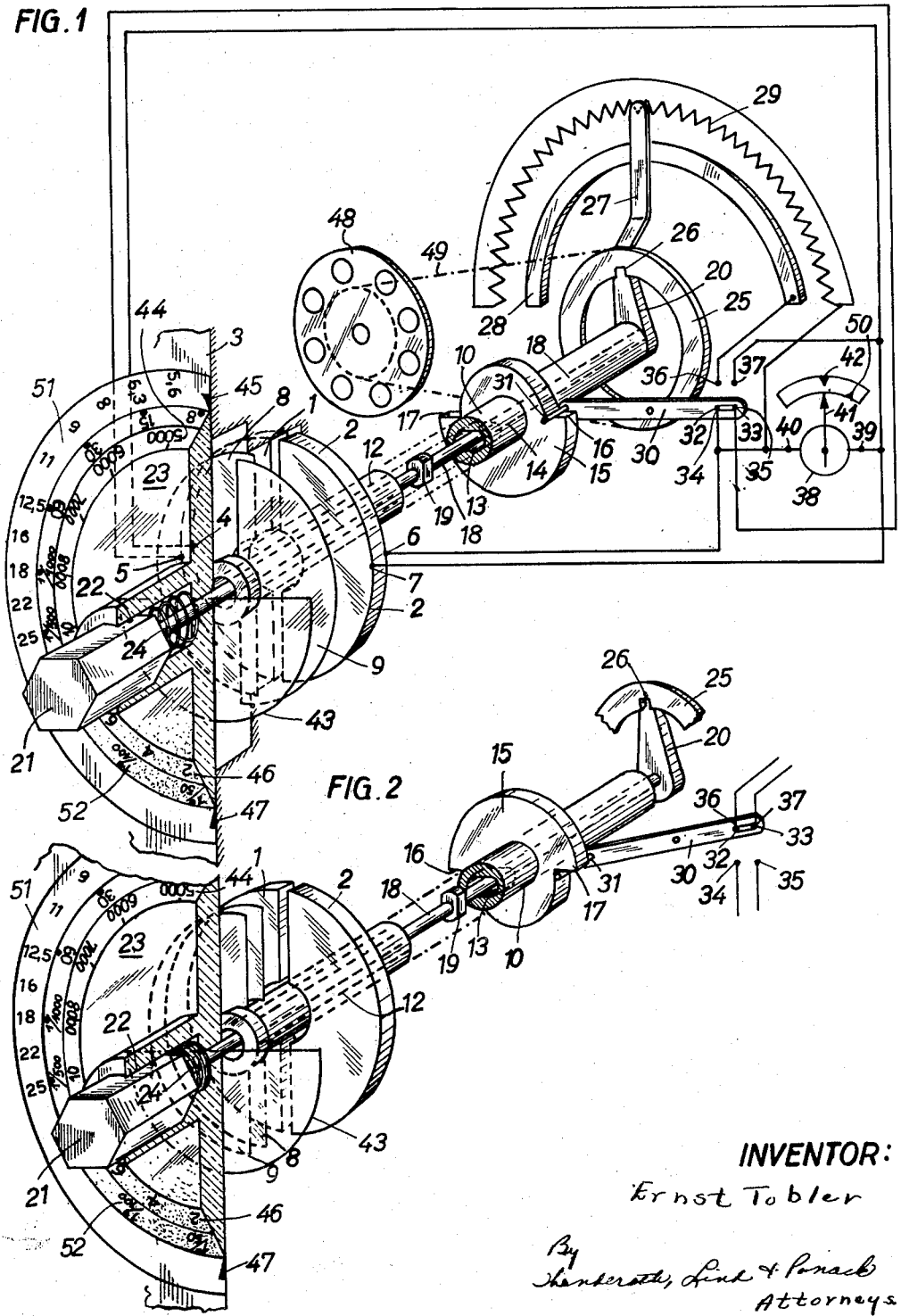

2,703,035

LIGHT MEASURING APPARATUS

Ernst Tobler, Unter-Wetzikon, Switzerland, assignor to Weka A.-G., Wetzikon, Switzerland Application August 7, 1951, Serial No. 240,664

4 Claims. (Cl. 88—22.5)

The present invention relates to light measuring apparatus and more particularly to apparatus for measuring the colour temperature and the intensity of light for colour photography purposes.

For such purposes instruments are known which indicate the colour temperature of the incident light and thus permit the selection of an adequate colour filter to be used in connection with the photographic camera. Other instruments indicate the total light intensity and permit a roughly adequate time of exposure and lens aperture to be selected. For satisfactory results, however, the time of exposure with a given lens aperture as indicated by the instruments of the second kind must be corrected to account for the colour temperature under the particular conditions of light. The correction factor must be calculated from the measured data by a comparatively complicated method which is a constant source of errors. Moreover the necessity of simultaneously using two separate instruments involves high expenses and is cumbersome.

One object of the present invention is to provide an apparatus which can easily be incorporated in a single instrument.

Another object of this invention is to provide an apparatus which automatically indicates both the colour filter to be used and the correct time of exposure and lens opening and which does away with the necessity of calculating and applying a time correction factor.

A further object is to provide an apparatus which can be incorporated in a camera for automatically selecting the adequate colour filter without obliging the operator to effect a colour temperature reading.

Other objects and advantages of the invention will become apparent from the description now to follow, of a preferred embodiment thereof, with reference to the accompanying drawing in which:

Fig. 1 is a partly diagrammatic representation of the essential parts of a light measuring instrument in the position they occupy while measuring the color temperature; and Fig. 2 shows the same parts in the position for determining the time of exposure and/or lens aperture.

In the drawing, reference numerals 1 and 2 indicate two photocell elements of conventional construction, each of which is substantially semi-circular in shape and which are concentrically mounted side by side in a housing generally indicated by 3. The photocell element 1 has two terminals 4 and 5, and the photocell element 2 two terminals 6 and 7. The device further comprises a blue colour filter 8, also of semi-circular shape, mounted in front of photocell element 1 and having substantially the same dimensions as the latter. In a plane slightly in front of the blue filter 8, a red colour filter 9, which equally is semi-circular in shape and has substantially the same dimensions as the blue filter 8, is mounted on a bush 10 supported in the housing 3 so as to be rotatable about the common axis of the two photocell elements 1, 2 and of the blue filter 8, whereby the red filter 9 can be rotated about the said axis so as to cover either the blue filter 8 and photocell 1 as shown in Fig. 2, or the photocell 2, as shown in Fig. 1. The bush 10 has an axial bore which comprises an outer cylindric portion 12, a short middle portion 13 of flattened cross-section, and an inner cylindric portion 14 of smaller diameter than portion 12. Fixed to the bush 10 there is a cam 15 the profile of which comprises two approximately semi-circular portions differing in radius and connected to each other by radial abutment surfaces 16 and 17.

In the bush 10, a spindle 18 is axially displaceable. This spindle is centered in the inner cylindric portion 14 of the bush and carries an integral collar 19 by which it is also centered in the outer cylindric portion 12; the collar 19, however, has flattened sides so that, when suitably displaced axially and angularly in the bush 10, this collar will be able to engage the flattened middle portion 13 of the bore in the bush, thereby coupling spindle 18 with the bush 10, red filter 9 and cam 15. An arm 20 is fixed on the inner end of spindle 18, so as to be rotatable and axially displaceable with the latter.

The outer end of spindle 18 carries a hexagonal knob 21 which engages a hexagonal recess 22 in the hub of a circular disc 23 made from transparent material. This disc 23 abuts against the housing and is pressed against the latter by a helical spring 24 inserted between the bottom of recess 22 and knob 21; this spring simultaneously presses the said knob outwards, this normally maintaining the spindle 18 in the axial position shown in Fig. 1, in which the arm 20 abuts against the inner end face of bush 10. On the inner face of disc 23, a semi-circular portion 43 substantially corresponding in shape and size to the contour of any of the filters 8, 9 and photocell elements 1, 2, is coated with opaque material to form a screen.

A metal ring 25 is rotatably mounted in the housing 3 coaxial with the spindle 18 and in the same plane as arm 20 when the latter is in the axial position shown in Fig. 1. In this position, the end of arm 20 engages a notch 26 in the inner circumference of ring 25. On ring 25 is mounted a contact spring 27 which slides both on a semi-circular contact rail 28 mounted in housing 3, and, on a resistor 29 also of semi-circular shape and concentric with contact rail 28.

Further, a switch lever 30 is swingably supported in housing 3. On its inner end, this lever 30 has a pin-shaped extension 31 projecting into the path of abutment faces 16 and 17 of cam 15 so that lever 30 can be actuated by the said faces 16, 17 between two positions. In one of these positions (see Fig. 1), a pair of contacts 32, 33, carried by the outer end of lever 30 and electrically connected to each other, establish electric connection between two contacts 34, 35 fixed in housing 3, and in the other position of lever 30 (see Fig. 2) contacts 32, 33 connect another pair of contacts 36, 37 in the housing.

The apparatus further comprises a galvanometer 38 through which the current passes between terminals 39 and 40, and the needle 41 of which faces a center mark 42 on the dial of the galvanometer when there is no difference of potential between the said terminals.

Referring now to the electrical connections in the apparatus, terminal 4 of photocell element 1 and terminal 7 of photocell element 2 are permanently connected to terminal 39 of the galvanometer 38. The opposite terminals 5 of photocell element 1 and 6 of photocell element 2 are connected to the opposite terminal 40 of the galvanometer; while the connection between terminals 6 and 40 is permanent, the connection between terminals 5 and 40 passes through contacts 34 and 35 of the switch device and thus is only closed when lever 30 is in its end position shown in Fig. 1.

In this case, photocell elements 1 and 2 are in circuit with the galvanometer parallel to each other but with corresponding terminals such as 4 and 6 of the two photocells connected to opposite terminals of the galvanometer, so that when the differences of potential produced in the two photocells are equal, the galvanometer needle 41 will face the center mark 42 on the dial.

Further, terminal 40 of the galvanometer is permanently connected to both ends of resistor 29, while the semi-circular contact rail 28 on which the contact spring 27 slides, is connected to terminal 39 through contacts 36, 37 of the switch device when lever 30 is in its other end position shown in Fig. 2. Thus, with lever 30 in the latter position, photocell element 1 is not in circuit with the galvanometer, while photocell element 2 and the portions of resistor 29 situated on either side of sliding contact spring 27 are in circuit with the galvanometer, parallel to each other.

The operation of the described measuring apparatus is as follows:

It will first be assumed that the red colour filter 9 is in an angular position in which its contour is in alignment with that of photocell 2, the switch lever 30 is in the position in which it connects contacts 34, 35 with each other, and the semi-circular screen 43 on disc 23 partially covers both filters 8 and 9, and simultaneously both photocell elements 1 and 2, by equal surfaces, the whole as shown in Fig. 1. If now through the unscreened portion of disc 23 and the corresponding portions of filters 8 and 9 light falls on the respective photocell elements 1 and 2, the needle 41 of the galvanometer will be deflected according to the different quantities of light absorbed by photocell elements 1 and 2. Only if the red component of the incident light is equal to its blue component, the light quantities admitted to photocells 1 and 2 by their respective blue and red filters 8 and 9 will be equal, and the needle 41 of galvanometer 38 will face the center mark 42. For colour photography under such conditions of light, it will not be necessary to use a colour filter, provided that the blue and red sensitivity of the film used is correctly balanced. Such light conditions, however, are seldom encountered. According as the blue or the red component of the incident light prevails, the photocell element 1 or the photocell element 2, respectively, will deliver more current than the other, whereby needle 41 is deflected from the center mark 42. If under such conditions of light no filter is used when taking colour photographs, the resulting pictures will show a bias towards the blue or the red, respectively. In order to determine what filter should be used to obtain a balanced picture, the disc 23 must be turned until its screening opaque portion 43 uncovers such unequal surfaces of colour filters 5, 6 that the currents raised by the incident light in their corresponding photocell elements 1, 2 become equal and the needle 41 of the galvanometer faces the center mark 42. The disc 23 carries a graduation 44 cooperating with a fixed mark 45 on the housing 3, which graduation is gauged to indicate the colour temperature of the incident light. The disc 23 may also carry a set of numerals 46 cooperating with another fixed mark 47, these numerals corresponding to the reference numerals carried by the individual filters of a set of colour filters, in such a way that the numeral 46 facing mark 47 indicates that filter which should be used for taking colour photographs under the prevailing light conditions.

Through the spindle 18 and the arm 20 engaging notch 26, the rotation of disc 23 also is transmitted to the ring 25 which carries the contact spring 27, so that the latter will vary the point on resistor 29 which is connected to contact rail 28. This adjustment, however, has no immediate effect as rail 28 is disconnected from the galvanometer and the photocell elements, at the contacts 36, 37, and serves a purpose later to become apparent.

It will be understood that the present apparatus could also be mounted in direct connection with a camera used in taking the colour photographs, or could be incorporated in the said camera. In this case, it would be possible to arrange the various colour filters to be used under different conditions of light, on a disc such as diagrammatically indicated at 48. By suitable linkage such as an endless belt 49, the filter disc 48 could be connected to ring 25 so that the disc 48 will be turned simultaneously with said ring and automatically place the correct colour filter in front of the camera objective. Instead of the disc 48, a transfer device carrying a filter band of continuously varying colour shading could be provided, or a similar filter band could be provided in the disc 48 instead of the separate filters.

The colour filter to be used having now been determined and/or placed in front of the camera objective, the second step consists in determining the adequate lens aperture and time of exposure. For this purpose, the hexagonal knob 21 is pressed half-way into the recess 22 of disc 23, whereby spindle 18 is axially moved and carries the arm 20 out of engagement with notch 26 of ring 25. The latter, and consequently the contact spring 22 of disc 23, whereby spindle 18 is axially moved and the colour temperature so far determined. Simultaneously, the disc 48 or other automatic filter changing device will be left in the adequate position. Then, with the knob 23 still depressed, the disc 23 is rotated until its screen portion 43 is congruent with the rotatable red filer 9; this will occur when disc 23 has been turned anti-clockwise by 90 degrees from the position in which it is shown in Fig. 1. Thereafter, knob 21 can be fully depressed into recess 22, whereby the flattened collar 19 engages the middle portion 13 of the longitudinal bore in brush 10. Spindle 18 and disc 23 thus are angularly coupled with bush 10, and arm 20 is moved further out of engagement with ring 25.

Now, with knob 21 fully depressed, the operator turns disc 23 in a clockwise direction, thus rotating bush 10, by 180 degrees. Thereby, the red filter 9 mounted on bush 10 is carried into the angular position shown in Fig. 2, in which it is congruent with the fixed blue filter 8, while photocell element 2 is open to the total incident light. Simultaneously, the abutment face 17 on cam 15 engages the pin 31 of lever 30 and thus swings the latter from the position shown in Fig. 1, in which its contacts 32, 33 connect the fixed contacts 34, 35, to the position shown in Fig. 2 in which contacts 32, 33 connect the fixed contacts 36, 37. When this is done, knob 21 can again be released half-way and turned back into the position shown in Fig. 2, leaving bush 10, and consequently the red filter 9 and the cam 15, and lever 30 as well, in the position also shown in Fig. 2. Care should however be taken, while returning disk 23 and in subsequent operations not to release fully the hexagonal knob 21, in order to prevent the arm 20 from engaging ring 25 when passing over the notch 26 and thus from disturbing the position of contact spring 27 and filter disc 48.

The photocell element 1 is now inoperative, because it is cut out of circuit at the contacts 34, 35, while photocell element 2 can be used for measuring the total light intensity. This element 2 now is in circuit with galvanometer 38, with the latter shunted by the variable resistor 29. According to the intensity of light which strikes element 2, this produces a current through the galvanometer and thus deflects the needle 41 of the latter. The galvanometer is gauged in such a way that for measuring the time of exposure it must indicate a certain current, the intensity of which is indicated by needle 41 facing a special mark 50. Disc 23 is now rotated, with knob 21 still half depressed, until the needle 41 faces the said mark 50. When this occurs, the time of exposure can be read, for any of the lens apertures marked on a fixed dial 51, on a time scale 52 engraved on disc 23. Of course, the time scale could also be indicated on the housing and the lens aperture scale on disc 23.

In determining the time of exposure, the resistor 29 acts as a means for correcting the said time in accordance with the adjustment of contact spring 27 obtained simultaneously with the determination of the colour temperature. Insofar as the contact spring 27 is moved out of its central position shown in Fig. 1, due to unbalance of the red and blue light components, the total resistance of resistor 29 is diminished, whereby the current passing through the galvanometer is lessened and the position of disc 23 must be adjusted to a longer exposure to obtain the correct position of needle 41. Thus a prolongation factor accounting for the colour temperature is incorporated in the reading. The time of exposure is therefore determined with the highest accuracy in accordance with the prevailing light conditions.

To restore the apparatus to its original position, disc 23 should be turned back to the position shown in Fig. 2 and thereafter rotated clockwise by 90 degrees with knob 21 half depressed; thereupon, knob 21 should be fully depressed to bring bush 10 once more into engagement with spindle 18. This will enable the operator to turn the red filter 9 and the cam 15 anti-clockwise into their position shown in Fig. 1. After releasing knob 21, the disc 23 is then once more turned clockwise until the end of arm 20 snaps into notch 26. The apparatus is then ready for effecting a new measurement of the colour temperature.

Means may be provided for preventing knob 21 and spindle 18 from returning to their original axial position as long as the bush 10 and cam 15 are in the position shown in Fig. 2. These means (not shown) could comprise a stationary cam surface cooperating with an axially displaceable pin guided in cam 15, the arrangement being such that the said stationary cam presses the said pin towards arm 20 when cam 15 is rotated into the said position, and prevents the arm 20 from returning into engagement with ring 25. When cam 15 is rotated back to the angular position according to Fig. 1, the cam would release the pin for sliding back and thus permit the arm 20 to revert to its original position.

As the commercially available films differ in sensibility, the stationary lens aperture scale 51 could also be engraved on an adjustable ring, so that by turning the said ring, the time scale and the aperture scale could be adjusted relatively to each other when a new film is loaded in the camera, in accordance with the sensibility of the film.

What I claim is:

1. Light measuring apparatus comprising two photocell elements, two colour filters transmitting in two different bands of the spectrum, each of said filters cooperating with one of said photocell elements, one of said colour filters being mounted so as to be movable to cover or uncover its cooperating photocell element, an opaque screen mounted so as to be movable over said photocell elements, an electric measuring instrument, a variable resistor, a switch operatively connectable to said opaque screen, a first circuit comprising said two photocell elements, said instrument and said switch for comparing the electric outputs of said two photocell elements in said instrument, a second circuit comprising that one of said photocell elements with which the said movable filter cooperates, said instrument, said switch and said resistor for indicating the output of said photocell element in said instrument, said circuits being alternately closable by said switch, and said variable resistor being operatively connectable to said opaque screen for adjustment in response to the position of the latter.

2. Light measuring apparatus as claimed in claim 1, in which said movable colour filter controls said switch to close said first circuit when said movable filter is positioned to cover its cooperating photocell element, and to close said second circuit when said movable filter is positioned to uncover its cooperating photocell element.

3. Light measuring apparatus as claimed in claim 1, including selective coupling means connected to said screen for alternately coupling the latter to said movable colour filter and to said adjustable resistor.

4. Light measuring apparatus as claimed in claim 1, including selective coupling means connected to said screen for alternately coupling the latter to said switch and to said adjustable resistor.

References Cited in the file of this patent

UNITED STATES PATENTS

| | | |
|---|---|---|
| 2,183,217 | Goldsmith | Dec. 12, 1939 |
| 2,203,036 | Briessen et al. | June 4, 1940 |
| 2,455,116 | Gittus | Nov. 30, 1948 |
| 2,579,347 | Taylor | Dec. 18, 1951 |
| 2,579,661 | Freund | Dec. 25, 1951 |

FOREIGN PATENTS

| | | |
|---|---|---|
| 508,802 | Great Britain | July 5, 1939 |
| 925,985 | France | Apr. 14, 1947 |